United States Patent
Athas et al.

(10) Patent No.: US 8,320,141 B2
(45) Date of Patent: Nov. 27, 2012

(54) HIGH-EFFICIENCY, SWITCHED-CAPACITOR POWER CONVERSION USING A RESONANT CLOCKING CIRCUIT TO PRODUCE GATE DRIVE SIGNALS FOR SWITCHING CAPACITORS

(75) Inventors: William C. Athas, San Jose, CA (US); P. Jeffrey Ungar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 532 days.

(21) Appl. No.: 12/535,974

(22) Filed: Aug. 5, 2009

(65) Prior Publication Data

US 2011/0031956 A1    Feb. 10, 2011

(51) Int. Cl.
*H02M 3/18*    (2006.01)
*H02M 7/00*    (2006.01)

(52) U.S. Cl. .................................. 363/59; 307/110
(58) Field of Classification Search ............ 323/242, 323/288, 290; 363/21.02, 21.03, 59–61
See application file for complete search history.

(56) References Cited

U.S. PATENT DOCUMENTS

| | | | | |
|---|---|---|---|---|
| 4,792,886 A | * | 12/1988 | Sahm | 363/60 |
| 4,807,104 A | * | 2/1989 | Floyd et al. | 363/59 |
| 5,051,881 A | * | 9/1991 | Herold | 363/60 |
| 5,187,421 A | * | 2/1993 | Naito | 363/59 |
| 5,559,478 A | | 9/1996 | Athas | |
| 5,677,077 A | | 10/1997 | Faulk | |
| 5,684,682 A | | 11/1997 | Zhong | |
| 5,760,637 A | | 6/1998 | Wong | |
| 5,920,235 A | * | 7/1999 | Beards et al. | 331/108 D |
| 6,028,374 A | * | 2/2000 | Razak | 307/130 |
| 6,169,673 B1 | | 1/2001 | McIntyre | |
| 6,188,590 B1 | | 2/2001 | Chang | |
| 6,559,689 B1 | | 5/2003 | Clark | |

(Continued)

FOREIGN PATENT DOCUMENTS

| | | |
|---|---|---|
| GB | 2374952 A | 10/2002 |
| WO | 02061930 A1 | 8/2002 |
| WO | 2006078244 A1 | 7/2006 |
| WO | 2009136369 A2 | 11/2009 |

OTHER PUBLICATIONS

Athas, W.C. et al., "A Resonant Signal Driver for Two-Phase, Almost-non-Overlapping Clocks", USC/Information Sciences Institute, 1996, IEEE, pp. 129-132.

(Continued)

*Primary Examiner* — Adolf Berhane
*Assistant Examiner* — Gary Nash
(74) *Attorney, Agent, or Firm* — Park, Vaughan, Fleming & Dowler LLP (57) ABSTRACT

Some embodiments of the present invention provide a system that efficiently converts between a lower input voltage and a higher output voltage. This system includes an input which receives the input voltage, and an output which provides the output voltage. The system also includes a first capacitor with a higher potential terminal and a lower potential terminal, as well as a first set of switching devices which selectively couple the higher potential and lower potential terminals of the first capacitor between the input voltage, the output voltage and a base voltage. The system additionally includes a resonant clocking circuit which generates clock signals with substantially non-overlapping clock phases, including a first phase and a second phase. This resonant clocking circuit is configured to control the first set of switching devices so that during the first phase, the higher potential terminal of the first capacitor is coupled to the input voltage and the lower potential terminal of the first capacitor is coupled to the base voltage, and during the second phase, the higher potential terminal of the first capacitor is coupled to the output voltage and the lower potential terminal of the first capacitor is coupled to the input voltage.

33 Claims, 5 Drawing Sheets

U.S. PATENT DOCUMENTS

| | | |
|---|---|---|
| 6,650,163 B1 * | 11/2003 | Burns et al. .................. 327/295 |
| 6,650,555 B2 | 11/2003 | Suzuki |
| 6,738,271 B2 | 5/2004 | Umeda |
| 2002/0041503 A1 | 4/2002 | Roohparvar |
| 2004/0196095 A1 | 10/2004 | Nonaka |
| 2006/0197583 A1 | 9/2006 | Yen |
| 2006/0290388 A1 | 12/2006 | Tolle |
| 2009/0167418 A1 | 7/2009 | Raghavan |
| 2010/0019749 A1 * | 1/2010 | Katsuya et al. ............... 323/282 |

OTHER PUBLICATIONS

Lenoir, Eric, "Getting the Most Out of Ceramic Capacitors", Power Electronics Technology, Aug. 1, 2003, Retrieved from the internet Aug. 17, 2010, http://powerelectronics.com/mag/power_getting_ceramic_capacitors/, pp. 1-5.

* cited by examiner

HIGH-EFFICIENCY, SWITCHED-CAPACITOR POWER CONVERSION USING A RESONANT CLOCKING CIRCUIT TO PRODUCE GATE DRIVE SIGNALS FOR SWITCHING CAPACITORS

BACKGROUND

1. Field

The disclosed embodiments generally relate to techniques for delivering DC power at different potentials. More specifically, the disclosed embodiments relate to a high-efficiency, switched-capacitor power-conversion technique, which uses a resonant clocking circuit to produce gate drive signals for switching transistors.

2. Related Art

Battery performance is critical to the effective operation of portable computing devices, such as laptop computers. To provide higher supply voltages, battery cells inside portable computing devices are typically stacked in series inside a battery pack. This arrangement provides power efficiently because conduction losses are lower in such a series arrangement. Unfortunately, providing power in this way is inefficient when the power is subsequently down-converted to provide lower voltages for certain system components. For example, the power is usually down-converted using buck converters or other down-conversion techniques that achieve only a 90% efficiency or worse. (Note that power=I·V, whereas conduction loss is proportional to $I^2 R$.)

A battery management unit (BMU) typically controls the charging and discharging processes for a battery pack. However, if the battery cells that comprise the battery pack are not matched in capacity, the battery pack can suffer from an imbalance condition. An imbalanced battery pack has reduced capacity because the cell with the highest state-of-charge will cause the charging process to terminate, which means that cells with a lower state-of-charge never get fully charged. Additionally, when the battery pack is discharged, the cell with the least charge may cause the discharging process to stop, even though charge may remain in other cells.

As an alternative to arranging battery cells in series to achieve higher voltages, voltage converters can be used to increase output voltages. However, existing voltage converter designs suffer from inefficiencies which are a significant power loss.

SUMMARY

Some embodiments of the present invention provide a system that efficiently converts a lower voltage to a higher voltage. This system includes an input which receives the lower voltage, and an output which provides the higher voltage. The system also includes a first capacitor with a higher potential terminal and a lower potential terminal, as well as a first set of switching devices which selectively couple the higher potential and lower potential terminals of the first capacitor between: the lower voltage, the higher voltage, and a voltage which is lower than the lower voltage called the "base voltage." The system additionally includes a resonant clocking circuit which generates clock signals with substantially non-overlapping clock phases, including a first phase and a second phase. This resonant clocking circuit is configured to control the first set of switching devices so that during the first phase, the higher potential terminal of the first capacitor is coupled to the lower voltage and the lower potential terminal of the first capacitor is coupled to the base voltage, and during the second phase, the higher potential terminal of the first capacitor is coupled to the higher voltage and the lower potential terminal of the first capacitor is coupled to the lower voltage.

In some embodiments, the resonant clocking circuit is an LC oscillator circuit which includes at least one inductance L and at least one capacitance C which is formed at least in part by the gates of one or more switching devices.

In some embodiments, the system also includes a battery that provides the lower voltage, wherein a lower potential terminal of the battery is coupled to the base voltage and a higher potential terminal of the battery is coupled to the lower voltage.

In some embodiments, the battery includes multiple battery cells which are coupled in parallel between the input and the base voltage.

In some embodiments, the system also includes a second set of switching devices and a second capacitor. In these embodiments, the resonant clocking circuit is additionally configured to control the second set of switching devices so that during the first phase, the higher potential terminal of the second capacitor is coupled to the higher voltage and the lower potential terminal of the second capacitor is coupled to the lower voltage, and during the second phase, the higher potential terminal of the second capacitor is coupled to the lower voltage and the lower potential terminal of the second capacitor is coupled to the base voltage.

In some embodiments, the system also includes an output capacitor coupled between the output and the base voltage. The system can also include an input capacitor coupled between the input and the base voltage.

In some embodiments, the first set of switching devices includes: a first switch which couples the higher potential terminal of the first capacitor to the lower voltage during the first phase; a second switch which couples the lower potential terminal of the first capacitor to the base voltage during the first phase; a third switch which couples the higher potential terminal of the first capacitor to the higher voltage during the second phase; and a fourth switch which couples the lower potential terminal of the first capacitor to the lower voltage during the second phase.

In some embodiments, the resonant clocking circuit includes a first phase output and a second phase output. It also includes a first inductor coupled between an oscillator voltage source and the first phase output, and a second inductor coupled between the oscillator voltage source and the second phase output. The resonant clock circuit additionally includes a first transistor with a source terminal coupled to the base voltage or lower, a drain terminal coupled to the first phase output, and a gate terminal coupled to the second phase output, and a second transistor with a source terminal coupled to the base voltage or lower, a drain terminal coupled to the second phase output, and a gate terminal coupled to the first phase output.

In some embodiments, the first set of switching devices includes power MOSFETs (Metal-Oxide-Semiconductor Field-Effect Transistors).

In some embodiments, the first capacitor includes one or more ceramic capacitors with an ultra-low equivalent series resistance (ESR) and an ultra-low equivalent series inductance (ESL).

In some embodiments, the system operates reversibly so that the output becomes the input and vice versa.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a technique for arithmetically scaling between a lower voltage, $V_{LO}$, by a ratio of M:N to a higher voltage, $V_{HI}$, where M and N are natural numbers. By performing the switching at relatively high frequencies, the conversion from input to output is performed with negligible conduction loss, i.e., the ratio of the power out, $P_o$, to power in, $P_i$, can be 99% or higher. To achieve such high efficiency, the only types of electrical components used for energy storage are capacitors and inductors. Additionally, a set of switching devices are used to couple one or more capacitors to each other, the input, or the output during one of two non-overlapping clocking phases. Each switching device provides a very low resistance and low inductance path when on, and an extremely high resistance path when off.

As the switching frequency increases, the power required to operate the switches becomes a significant contributor to power dissipation and ultimately limits the efficiency of the system. To overcome this limitation, a resonant-energy circuit is used, which is compatible with the two-phase clocking requirements and the operational characteristics of the switching devices.

Voltage Converter

Figure 1:
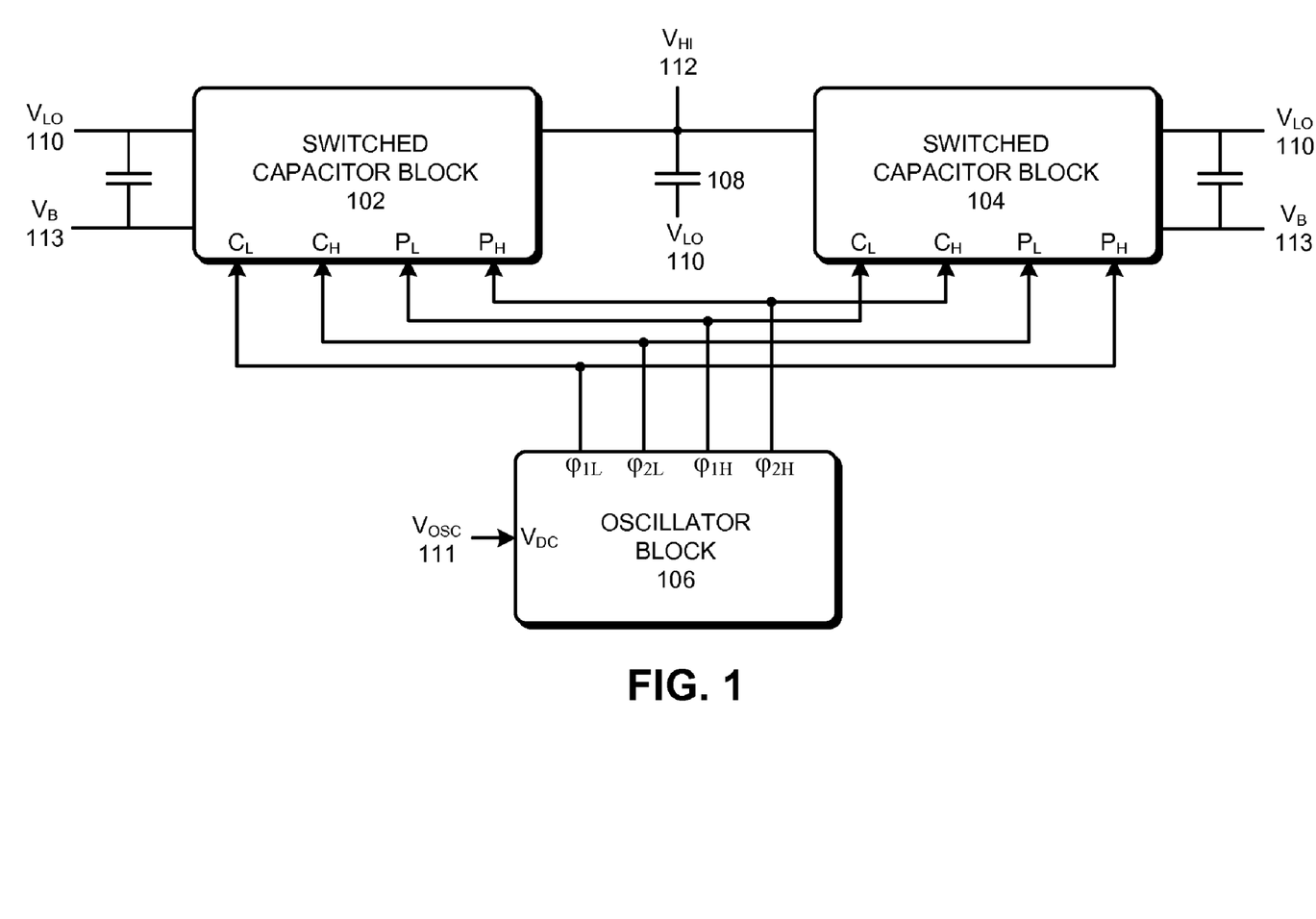
FIG. 1 illustrates a voltage converter in accordance with an embodiment of the present invention.

FIG. 1 illustrates a voltage converter in accordance with an embodiment of the present invention. In the illustrated embodiment, an oscillator block 106 receives an oscillator supply voltage $V_{OSC}$ from an oscillator voltage source and produces four versions of the two-phase clock, namely $C_L$, $C_H$, $P_L$ and $P_H$. This two-phase clock controls two switched capacitor blocks (SCBs) 102 and 104 that drive the output, $V_{HI}$, during opposite clock phases. During forward operation, SCBs 102 and 104 convert a lower input voltage $V_{LO}$ 110 to a higher output voltage $V_{HI}$ 112, which asymptotically equals $2V_{LO}-V_B$. More specifically, during a first clock phase, SCB 102 provides an output voltage $V_{HI}$ 112 which equals $2V_{LO}-IR_{O1}-V_B$ (where $R_{O1}$ is the effective resistance of SCB 102 and I is the output current), while SCB 104 is decoupled from $V_{HI}$ 112. Similarly, during a second clock phase, SCB 104 provides an output voltage $V_{HI}$ 112 which equals $2V_{LO}-IR_{O2}-V_B$ (where $R_{O2}$ is the effective resistance of SCB 104 and I is the output current), while SCB 102 is decoupled from $V_{HI}$ 112. Note that one function of the output capacitor 108 is to supply energy to the output when neither SCB drives the output.

Switched Capacitor Block

Figure 2:
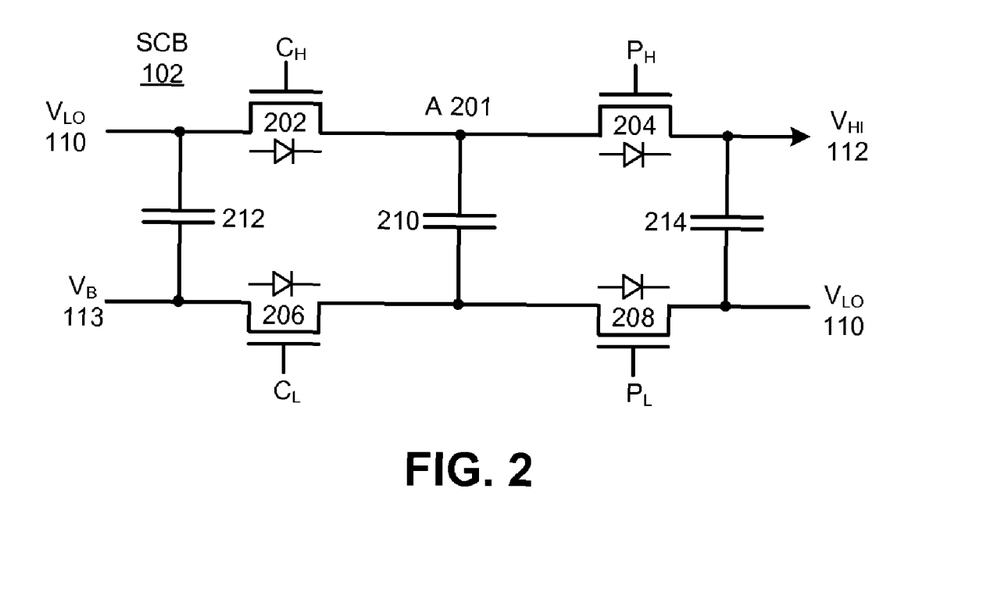
FIG. 2 illustrates the structure of a switched capacitor block in accordance with an embodiment of the present invention.

FIG. 2 illustrates the structure of a switched capacitor block (SCB) 102 in accordance with an embodiment of the present invention. SCB 102 includes a capacitor 210 (also referred to as a "pump capacitor") and a set of switching devices 202, 204, 206 and 208. In the illustrated embodiment, switching devices 202, 204, 206 and 208 are power Metal-Oxide-Semiconductor Field-Effect Transistors (MOSFETs). Note that FIG. 2 also depicts the directionality of the body diodes for each of the MOSFETs 202, 204, 206 and 208.

FIG. 2 additionally illustrates the connections for MOSFETs 202, 204, 206 and 208. More specifically, MOSFET 202 couples the higher potential terminal of capacitor 210 to $V_{LO}$ 110 under control of clock input $C_H$; MOSFET 206 couples the lower potential terminal of capacitor 210 to the base voltage, $V_B$ 113 under control of clock input $C_L$; MOSFET 204 couples the higher potential terminal of capacitor 210 to $V_{HI}$ 112 under control of clock input $P_H$; and MOSFET 208 couples the lower potential terminal of capacitor 210 to $V_{LO}$ 110 under control of clock input $P_L$.

During the first clock phase, the higher potential terminal of capacitor 210 is coupled to $V_{LO}$ 110, and the lower potential terminal of capacitor 210 is coupled to $V_B$. This allows the voltage across capacitor 210 to be charged up to $V_{LO}-V_B$. During the second clock phase, the higher potential terminal of capacitor 210 is coupled to $V_{HI}$ 112, and the lower potential terminal of capacitor 210 is coupled to $V_{LO}$ 110. In this way, the voltage across capacitor 210 is stacked on top of $V_{LO}$ 110 to produce output voltage $V_{HI}$ $112=2V_{LO}-V_B-I_OR_O$, wherein $I_O$ is the output current.

In one embodiment of the present invention, capacitor 210 is implemented using a bank of parallel capacitors, wherein each capacitor is a 100 μF ceramic type capacitor. The lower potential terminal of the capacitor bank swings between $V_B$ and $V_{LO}$. Hence, the gate drive for MOSFET 208, which couples the lower potential terminal of the capacitor bank to $V_{LO}$, must have a voltage swing of at least $V_G+V_{LO}$, wherein $V_G$ is the gate drive voltage required for $R_{ds}$(on) to reach its minimal on resistance. Likewise, the higher potential terminal of capacitor 210 swings between $V_{LO}$ and $V_{HI}$. Hence, it is not necessary for MOSFETs 202 and 204, which are connected to the higher potential terminal of the capacitor bank, to swing below $V_{LO}$. These gate drive signals can be biased by the input voltage to swing between $V_{LO}+V_B+V_G$ and $V_{HI}+V_B+V_G$. Note that the energy required to drive each gate is proportional to $(V_{LO}+V_G)^2$.

Figure 6:
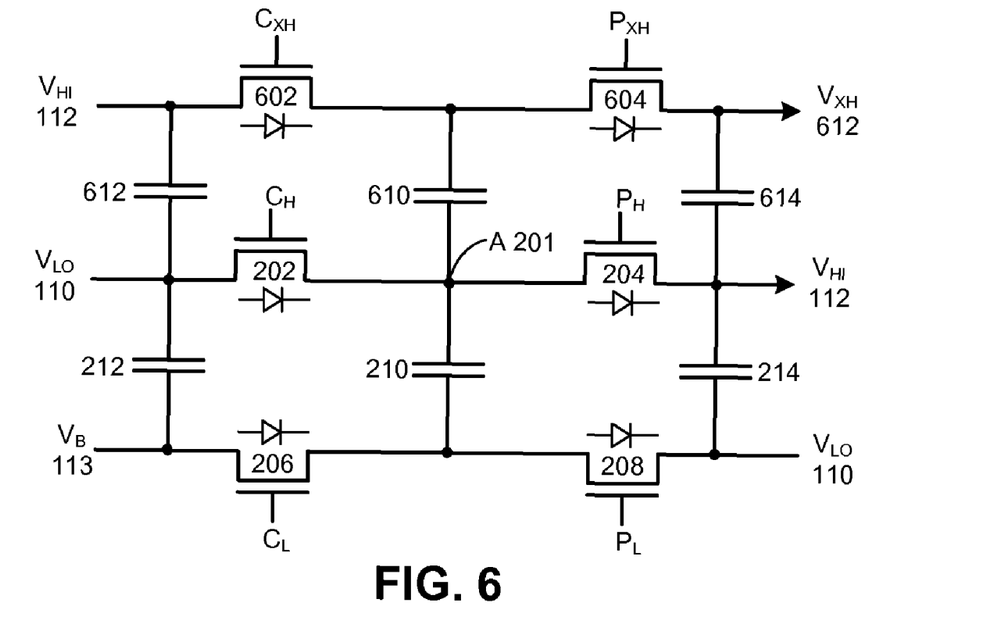
FIG. 6 illustrates the structure of a cascadable switched capacitor block (SCB) in accordance with an embodiment of the present invention.

FIG. 6 illustrates how a voltage higher than $V_{HI}$ may be obtained with the addition of two switching devices and three capacitors. More specifically, FIG. 6 contains all of the circuitry illustrated in FIG. 2 and additionally contains two transistors 602 and 604 and three capacitors 610, 612 and 614. Note that the lower terminal of capacitor 610 attaches to node A 201. During system operation, node A 201 swings from $V_{LO}$ to $V_{HI}$. Transistor 602 is turned on when node A 201 is at $V_{LO}$, which causes capacitor 610 to charge up to $V_{HI}-V_{LO}$. Next, transistor 604 is turned on when node A 201 reaches $V_{HI}$. This causes the output voltage $V_{XH}$ 612 to reach $V_{HI}+V_{LO}$. In this way the circuit illustrated in FIG. 6 effectively acts as a voltage tripler. To one skilled in the art, a quadrupler, etc., may be constructed by again applying the transformation from FIG. 2 to FIG. 6. Note that because the circuitry illustrated in FIG. 6 is reversible, one can consider any of the points above $V_B$ to be the input, and the rest will be outputs. For example, if $V_{LO}$ is the input and $V_B$ is ground, $V_{HI}$ provides a 2× output and $V_{XH}$ provides a 3× output. Alternatively, if $V_{HI}$ is the input, $V_L$ provides a 1/2× output and $V_{XH}$ provides a 3/2× output. Similarly, if $V_{XH}$ is the input, $V_{HI}$ provides a 2/3× output and $V_{LO}$ provides a 1/3× output.

Voltage-Conversion Process

Figure 3:
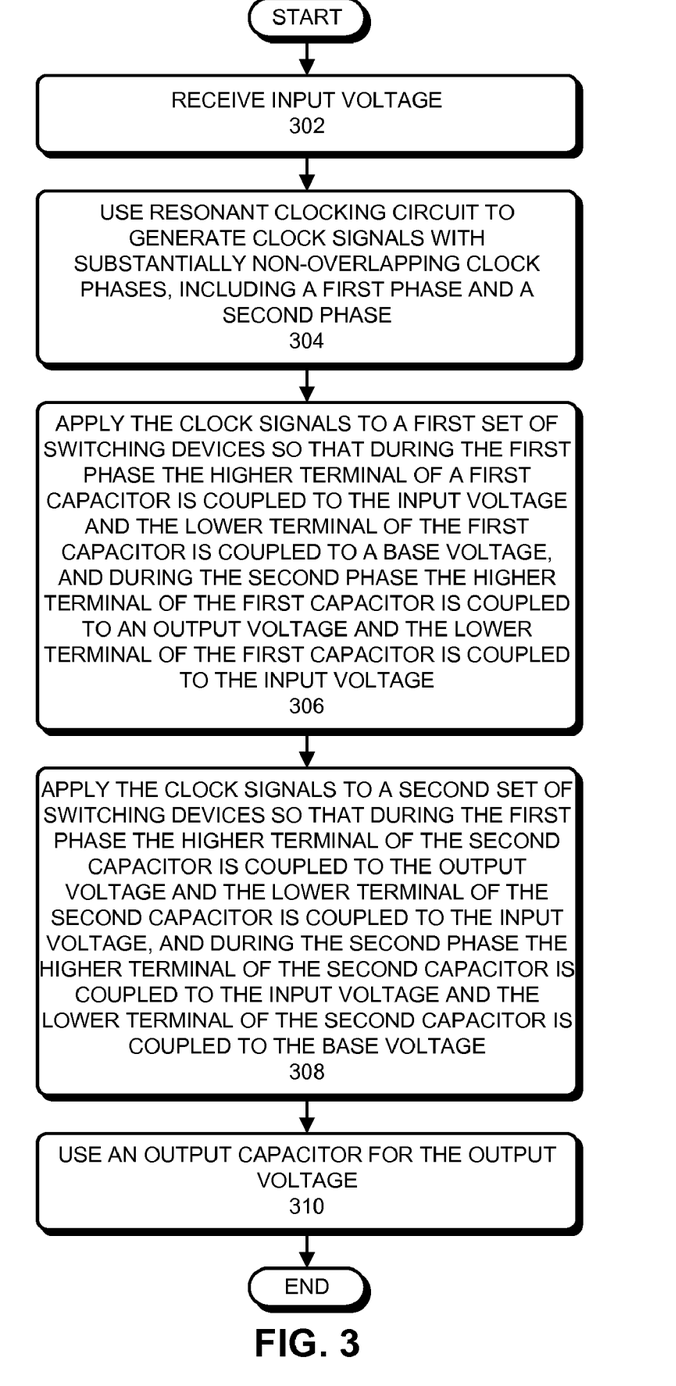
FIG. 3 presents a flowchart illustrating the voltage-conversion process in accordance with an embodiment of the present invention.

FIG. 3 presents a flowchart illustrating the voltage-conversion process in accordance with an embodiment of the present invention. This flow chart covers the operation of the system illustrated in FIG. 1. During operation, the system receives an input voltage $V_{LO}$ (step 302). Next, the system uses a resonant clocking circuit to generate clock signals with substantially non-overlapping clock phases, including a first phase and a second phase (step 304).

These clock signals are applied to a first set of switching devices (inside SCB 102), so that during the first phase the higher potential terminal of a first capacitor is coupled to the input voltage and the lower potential terminal of the first capacitor is coupled to the base voltage, and during the second phase the higher potential terminal of the first capacitor is coupled to the output voltage and the lower potential terminal of the first capacitor is coupled to the input voltage (step 306).

These clock signals are also applied to a second set of switching devices (inside SCB 104), so that during the first phase the higher potential terminal of the second capacitor is coupled to the output voltage and the lower potential terminal of the second capacitor is coupled to the input voltage, and during the second phase the terminal of the second capacitor is coupled to the input voltage and the lower potential terminal of the second capacitor is coupled to ground (step 308). Finally, an output capacitor 108 is used to perform a number of functions, including filtering the output voltage (step 310).

Resonant Clocking Circuit

Figure 4:
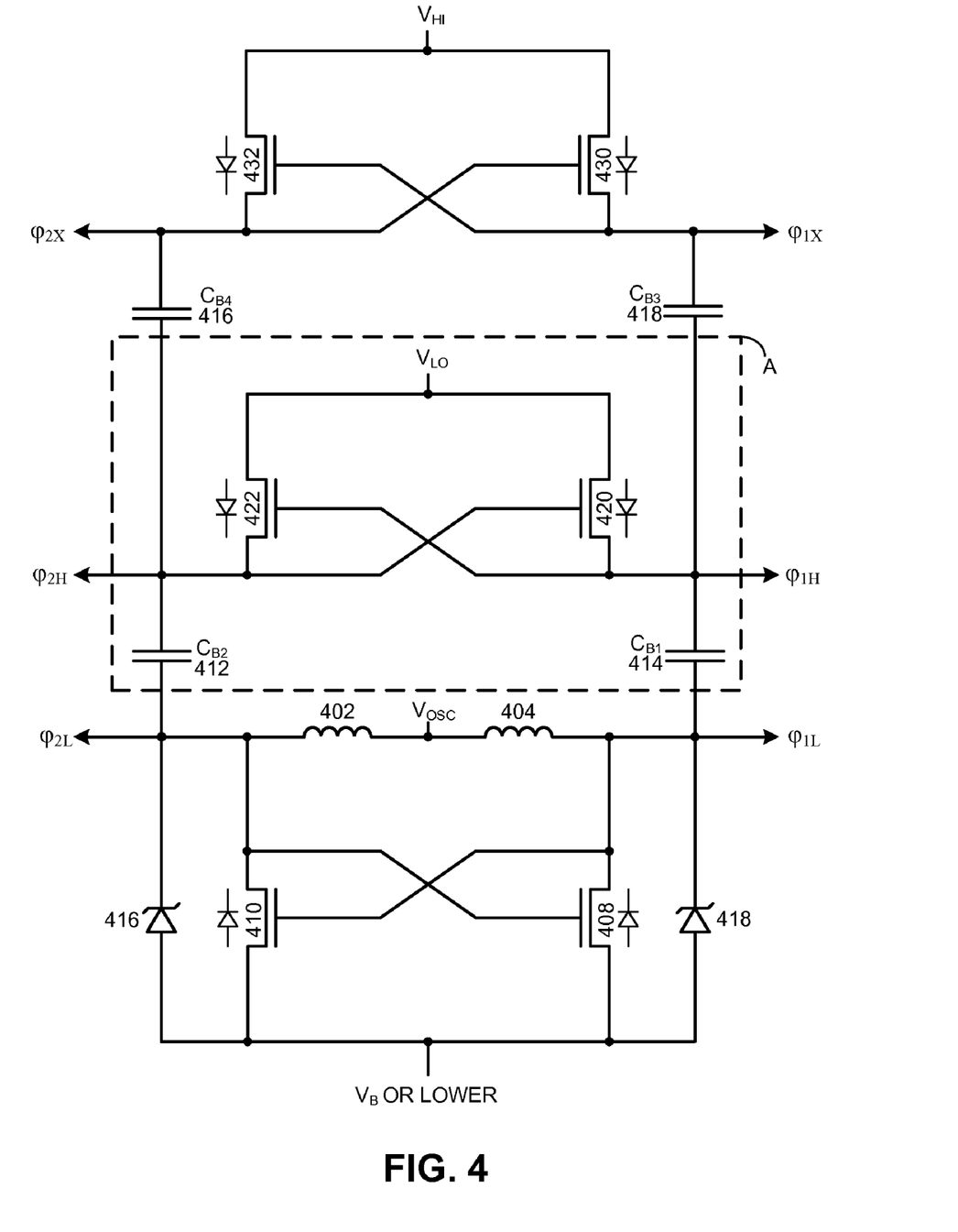
FIG. 4 illustrates a resonant-clocking circuit in accordance with an embodiment of the present invention.

FIG. 4 illustrates a resonant clocking circuit in accordance with an embodiment of the present invention. Referring to the bottom portion of FIG. 4, the basic resonant clocking circuit includes two complementary circuit sections that produce opposing clock phases. The first circuit section includes inductor 402 and FET 410 and produces output $\phi_{2L}$. The second complementary circuit section includes inductor 404 and FET 408 and produces output $\phi_{1L}$, wherein $\phi_{1L}$ and $\phi_{2L}$ provide opposing clock phases. Note that FETs 408 and 410 are cross-coupled so that the control input for each of FETs 408 and 410 is taken from the output from the complementary circuit section. Also note that the gate capacitance for each FET is lumped in with the output-load capacitance for the opposing clock phase. (Also note that the load capacitance is the gate capacitance at the SCB.)

During operation of this resonant clocking circuit, energy oscillates back and forth between inductive and capacitive circuit elements without a significant conductive or switching loss. More specifically, in the first circuit section, energy oscillates between inductor 402 and the load capacitance for output $\phi_{2L}$, which is lumped in with the gate capacitance for the opposing FET 408. Similarly, in the second circuit section, energy oscillates between inductor 404 and the load capacitance for output $\phi_{1L}$, which is lumped in with the gate capacitance for the opposing FET 410.

The top portion of FIG. 4 illustrates corresponding circuitry which generates outputs $\phi_{1H}$ and $\phi_{2H}$. The voltages on outputs $\phi_{1H}$ and $\phi_{2H}$ track the voltages on outputs $\phi_{1L}$ and $\phi_{2L}$, but are biased to be at higher voltage levels. This is accomplished by using two bootstrap capacitors, $C_{B1}$ 414 and $C_{B2}$ 412, and two cross-coupled FETs 422 and 420 that clamp the elevated clock output to $V_{LO}$ during one phase and then follow the clock output with a positive offset of $V_{LO}$ during the other phase. The elevated voltage levels on outputs $\phi_{1H}$ and $\phi_{2H}$ can be used to drive MOSFETs 202 and 204 which are illustrated in FIG. 2. As mentioned in the discussion above, these MOSFETs need gate drive signals that swing between $V_{LO}$ and $V_{HI}+V_G$. As is illustrated in the top portion of FIG. 4, the dotted line box A can be stacked again to provide the "extrahigh" (XH) outputs of FIG. 6.

Note that Zener diodes 416 and 418 (which, for example, can be 19V Zener diodes) are coupled between outputs $\phi_{1L}$ and $\phi_{2L}$, respectively, and ground to protect the circuit against large transient voltages during power up. Note also that transistors 420 and 422 could be replaced with ordinary diodes with an anode coupled to $V_{LO}$ and a cathode coupled to $\phi_{1H}$ or $\phi_{2H}$.

Power Supply Design

Figure 5:
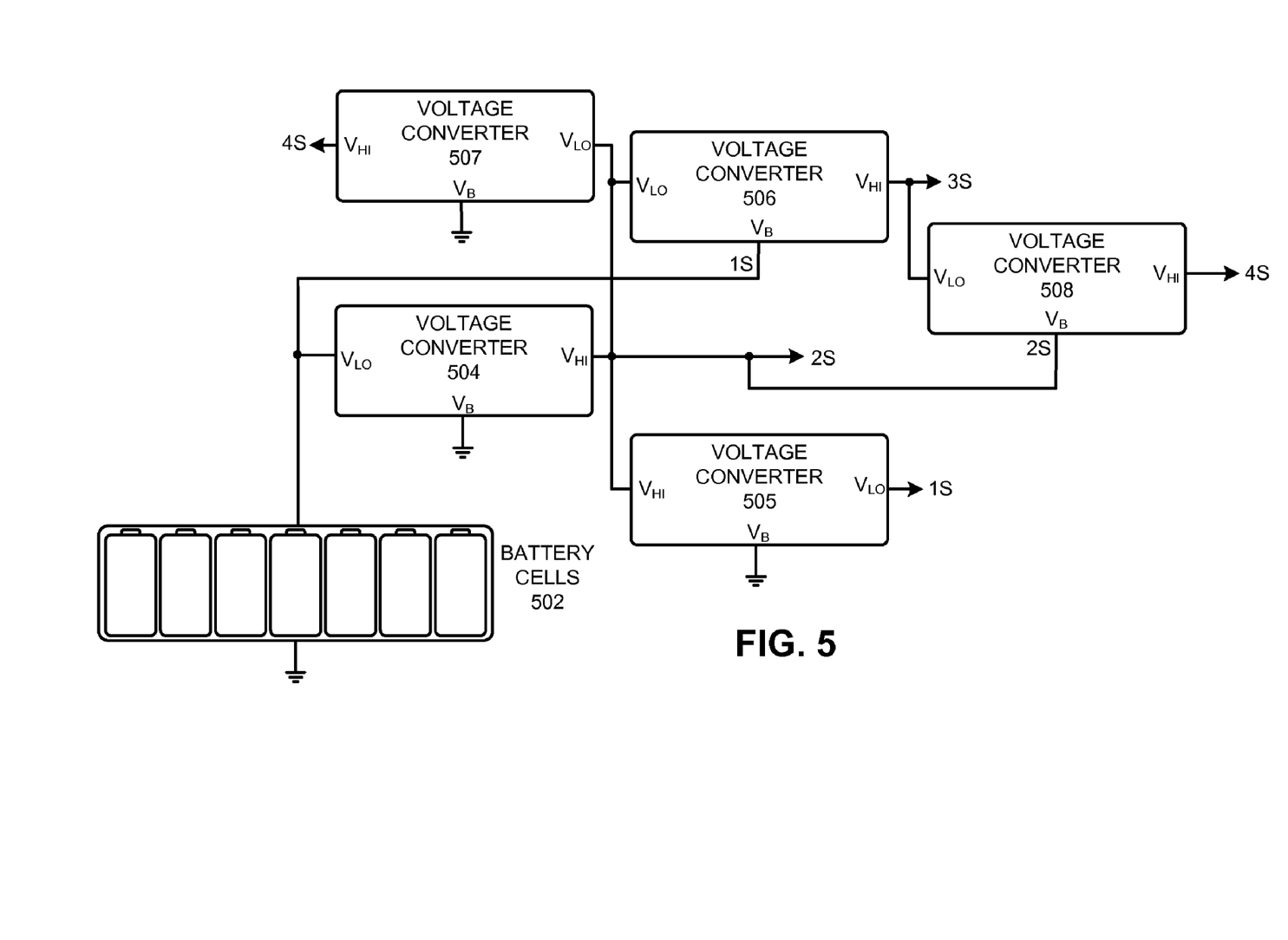
FIG. 5 illustrates how voltage converters and a battery can be arranged to implement a power supply in accordance with an embodiment of the present invention.

FIG. 5 illustrates how voltage converters and a battery can be arranged to implement a power supply in accordance with an embodiment of the present invention. The power supply illustrated in FIG. 5 includes voltage converters 504-508, as well as a number of battery cells 502. Voltage converters 504-508 can be implemented using the voltage converter circuit described above with reference to FIG. 1.

Note that battery cells 502 are coupled together in parallel to provide a 1S output for the power supply. (Note that the 1S output provides a voltage which is equivalent to a voltage from a single bank of one or more cells coupled together in parallel. In contrast, a 2S output would provide a voltage which is equivalent to a voltage from two banks of cells, wherein the banks are coupled together in series.) This parallel architecture has a number of advantages, such as eliminating cell imbalance problems, allowing accurate measurements of a cell's state-of-charge, increased design flexibility, and fault tolerance.

Battery cells 502 also provide an input voltage for voltage converter 504, and the base voltage for voltage converter 504 is tied to ground. Hence, voltage converter 504 doubles this input voltage to provide a 2S output for the power supply. The output of voltage converter 504 feeds into the $V_{HI}$ input of voltage converter 505, which divides the 2S output from voltage converter 504 by a factor of two to produce a 1S output for the power supply.

Additionally, output of voltage converter 504 feeds into the $V_{LO}$ input of voltage converter 506, and the base voltage for voltage converter 506 is received from the output of battery cells 502. As a result, voltage converter 506 provides an output which is three times the voltage from battery cells 502. This output provides a 3S output for the power supply.

Note that the circuit illustrated in FIG. 6 also produces a 3S output but uses fewer transistors. More specifically, voltage converters 504 and 506, which are coupled together in FIG. 5 to produce a 3S output, collectively contain 8 transistors. In contrast, the circuit illustrated in FIG. 6 also produces a 3S output, but only contains 6 transistors.

The output of voltage converter 504 also feeds into the $V_{LO}$ input of voltage converter 507, and the base voltage for voltage converter 507 is tied to ground. Hence, voltage converter 507 doubles the 2S output from voltage converter 504 to provide an output which is four times the voltage from battery cells 502. This output provides a 4S output for the power supply.

Likewise, the 3S output of voltage converter 506 also feeds into the $V_{LO}$ input of voltage converter 508, and the base voltage for voltage converter 508 is obtained from the 2S output of voltage converter 504. Hence, voltage converter 508 adds the 1S difference between the 3S output of voltage converter 506 and the 2S output of voltage converter 504 to the 2S output from voltage converter 504 to provide an output which is four times the voltage from battery cells 502. This output provides a 4S output for the power supply. Note that voltage converters 507 and 508 produce the same 4S output but have different requirements for switch and capacitor performance. More specifically, voltage converter 507 performs a direct doubling of the 2S output of voltage converter 504 to produce the 4S output, whereas voltage converters 506 and 508 are organized in a cascade arrangement to produce the 4S output from the 2S output of voltage converter 504.

The above-described voltage converter configurations can be extended to provide power supply outputs for any multiple of S. Also, note that any output could be used as an input to charge the battery.

Efficiency

The above-described power-conversion technique is potentially very efficient. In fact, one implementation achieves a conversion efficiency at many watts of better than 99%. This extremely high conversion efficiency is made possible by a number of factors. (1) Referring to FIG. 1, the SCBs 102 and 104 use ceramic capacitors with an ultra-low equivalent series resistance (ESR) and an ultra-low equivalent series inductance (ESL). (2) Also, a resonant LC circuit is used in oscillator block 106 to generate gate drive signals for SCBs 102 and 104 without dissipating a significant amount of power. Note that within this resonant LC circuit energy oscillates back and forth between inductive and capacitive circuit elements without a significant resistive or switching loss. (3) Finally, the switched capacitor blocks (SCBs) 102 and 104 use MOSFETs with a very low on-resistance. Note that at a high frequency F, $R_O$ is asymptotically limited by $R_{ON}$. To minimize the total power consumption, a designer ideally seeks to balance the power consumption associated with cycling the gates of the FETs against the losses associated with the output resistance of the SCB (namely, $I_O^2 R_O$). Power dissipation includes conduction losses, $I^2 R_O$, and gate drive losses which are proportional to $FC_G(V_{LO}+V_G)^2$. Note that $R_O$ decreases with increasing frequency, larger gate capacitance $C_G$, and higher gate-drive voltage, $V_{LO}+V_G$.

Reversibility

The above-described power-conversion technique is also entirely reversible, which means the technique can also be used to charge the battery cells instead of only discharging the battery cells. Note that the direction of the current and the magnitude of the voltage conversion depends on the relative impedance between $V_{HI}$ and $V_{LO}$.

Scalability

Also note that we can cascade the bootstrap circuits illustrated in FIG. 4 and the SCBs illustrated in FIG. 5 to scale the output voltage to higher levels. Alternatively, the output voltage can be scaled using the technique illustrated in FIG. 6. By scaling the circuits using the above-described techniques, it is possible to produce 3S, 4S, 5S, 6S, and even outputs with larger multiples of S.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A system for converting between an input voltage and an output voltage, comprising:
   an input coupled to the input voltage;
   an output coupled to the output voltage;
   a first and a second capacitor, each with a higher potential terminal and a lower potential terminal;
   a first set of switching devices which selectively couple the higher potential and lower potential terminals of the first capacitor between the input voltage, the output voltage and a base voltage;
   a second set of switching devices; and
   a resonant clocking circuit which generates clock signals with substantially non-overlapping clock phases, including a first phase and a second phase, for the first set of switching devices;
   wherein the resonant clocking circuit is configured to control the first set of switching devices so that during the first phase the higher potential terminal of the first capacitor is coupled to the input voltage and the lower potential terminal of the first capacitor is coupled to the base voltage, and during the second phase the higher potential terminal of the first capacitor is coupled to the output voltage and the lower potential terminal of the first capacitor is coupled to the input voltage,
   wherein the resonant clocking circuit is configured to control the second set of switching devices so that during the first phase the higher potential terminal of the second capacitor is coupled to the output voltage and the lower potential terminal of the second capacitor is coupled to the input voltage, and during the second phase the higher potential terminal of the second capacitor is coupled to the input voltage and the lower potential terminal of the second capacitor is coupled to the base voltage.

2. The system of claim 1, wherein the resonant clocking circuit is an LC oscillator circuit which includes at least one inductance and at least one capacitance.

3. The system of claim 2, wherein the at least one capacitance is a gate of a charge-controlled switching device which is used to implement a switching device in the first set of switching devices.

4. The system of claim 1, further comprising a battery that provides the input voltage, wherein a lower potential terminal of the battery is coupled to the base voltage and a higher potential terminal of the battery is coupled to the input, and wherein the battery includes one or more battery cells which are coupled in parallel between the input and the base voltage.

5. The system of claim 1, further comprising a capacitor coupled between the output and the input.

6. The system of claim 1, further comprising a capacitor coupled between the input and the base voltage.

7. The system of claim 1, further comprising a capacitor coupled between the output and the base voltage.

8. The system of claim 1, wherein the first set of switching devices includes:
   a first switch which couples the higher potential terminal of the first capacitor to the input voltage during the first phase;
   a second switch which couples the lower potential terminal of the first capacitor to the base voltage during the first phase;
   a third switch which couples the higher potential terminal of the first capacitor to the output voltage during the second phase; and
   a fourth switch which couples the lower potential terminal of the first capacitor to the input voltage during the second phase.

9. The system of claim 2, wherein the resonant clocking circuit is an LC oscillator circuit which includes at least two inductances and at least two capacitances.

10. The system of claim 9, wherein the resonant clocking circuit includes:

a first phase output;
a second phase output;
a first inductor coupled between a voltage source and the first phase output;
a second inductor coupled between the voltage source and the second phase output;
a first transistor with a source terminal coupled to the base voltage, a drain terminal coupled to the first phase output, and a gate terminal coupled to the second phase output; and
a second transistor with a source terminal coupled to the base voltage, a drain terminal coupled to the second phase output, and a gate terminal coupled to the first phase output.

11. The system of claim 1, wherein the first set of switching devices includes power MOSFETs (Metal-Oxide-Semiconductor Field-Effect Transistors).

12. The system of claim 1, wherein the first capacitor includes one or more ultra-low-ESR and ultra-low-ESL ceramic capacitors.

13. A method for converting a voltage, comprising:
receiving an input voltage through an input;
using a resonant clocking circuit to generate clock signals with substantially non-overlapping clock phases, including a first phase and a second phase;
applying the clock signals to a first set of switching devices which are configured to selectively couple a higher potential terminal and a lower potential terminal of a first capacitor between the input voltage, an output voltage and a base voltage, so that during the first phase the higher potential terminal of the first capacitor is coupled to the input voltage and the lower potential terminal of the first capacitor is coupled to the base voltage or lower, and during the second phase the higher potential terminal of the first capacitor is coupled to an output voltage and the lower potential terminal of the first capacitor is coupled to the input voltage;
applying the clock signals to a second set of switching devices which are configured to selectively couple a higher potential terminal and a lower potential terminal of a second capacitor between the input voltage, an output voltage and the base voltage, so that during the first phase the higher potential terminal of the second capacitor is coupled to the output voltage and the lower potential terminal of the second capacitor is coupled to the input voltage, and during the second phase the higher potential terminal of the second capacitor is coupled to the input voltage and the lower potential terminal of the second capacitor is coupled to the base voltage; and
providing the output voltage through an output.

14. The method of claim 13, wherein using the resonant clocking circuit to generate the clock signals involves using an LC oscillator to generate the clock signals.

15. The method of claim 13, wherein receiving the input voltage involves receiving the input voltage from a battery.

16. The method of claim 15, wherein receiving the input voltage involves receiving the input voltage from a battery which includes one or more battery cells which are coupled in parallel between the input and the base voltage.

17. The method of claim 13, further comprising using an output capacitor, which is coupled between the output and the base voltage.

18. The method of claim 13, further comprising using an input capacitor, which is coupled between the input and the base voltage.

19. The method of claim 14, further comprising using a capacitor, which is coupled between the input and the output.

20. The method of claim 13, wherein the first set of switching devices includes:
a first switch which couples the higher potential terminal of the first capacitor to the input voltage during the first phase;
a second switch which couples the lower potential terminal of the first capacitor to the base voltage during the first phase;
a third switch which couples the higher potential terminal of the first capacitor to the output voltage during the second phase; and
a fourth switch which couples the lower potential terminal of the first capacitor to the input voltage during the second phase.

21. The method of claim 13, wherein the resonant clocking circuit includes:
a first phase output;
a second phase output;
a first inductor coupled between a voltage source and the first phase output;
a second inductor coupled between the voltage source and the second phase output;
a first transistor with a source terminal coupled to the base voltage, a drain terminal coupled to the first phase output, and a gate terminal coupled to the second phase output; and
a second transistor with a source terminal coupled to the base voltage, a drain terminal coupled to the second phase output, and a gate terminal coupled to the first phase output.

22. The method of claim 13, wherein the first set of switching devices include power MOSFETs (Metal-Oxide-Semiconductor Field-Effect Transistors).

23. The method of claim 13, wherein the first capacitor includes one or more ultra-low-ESR and ultra-low ESL ceramic capacitors.

24. A power supply, comprising:
a battery that provides an input voltage;
an output that provides an output voltage;
a first and a second capacitor, each with a higher potential terminal and a lower potential terminal;
a first set of switching devices which selectively couple the higher potential and lower potential terminals of the first capacitor between the input voltage, the output voltage and a base voltage;
a second set of switching devices;
a resonant clocking circuit which generates clock signals with substantially non-overlapping clock phases, including a first phase and a second phase, for the first set of switching devices;
wherein the resonant clocking circuit is configured to control the first set of switching devices, so that during the first phase the higher potential terminal of the first capacitor is coupled to the input voltage and the lower potential terminal of the first capacitor is coupled to the base voltage, and during the second phase the higher potential terminal of the first capacitor is coupled to the output voltage and the lower potential terminal of the first capacitor is coupled to the input voltage; and
wherein the resonant clocking circuit is configured to control the second set of switching devices, so that during the first phase the higher potential terminal of the second capacitor is coupled to the output voltage and the lower potential terminal of the second capacitor is coupled to the input voltage, and during the second phase the higher potential terminal of the second capacitor is coupled to the input voltage and the lower potential terminal of the second capacitor is coupled to the base voltage.

25. The power supply of claim 24, wherein the resonant clocking circuit is an LC oscillator circuit which includes at least one inductance and at least one capacitance.

26. The power supply of claim 24, wherein the battery includes one or more battery cells which are coupled in parallel between the input and the base voltage.

27. The power supply of claim 24, further comprising an output capacitor coupled between the output and the base voltage.

28. The power supply of claim 24, further comprising an input capacitor coupled between the input and the base voltage.

29. The power supply of claim 24, further comprising a capacitor coupled between the output and the input.

30. The power supply of claim 24, wherein the first set of switching devices includes:
- a first switch which couples the higher potential terminal of the first capacitor to the input voltage during the first phase;
- a second switch which couples the lower potential terminal of the first capacitor to the base voltage during the first phase;
- a third switch which couples the higher potential terminal of the first capacitor to the output voltage during the second phase; and
- a fourth switch which couples the lower potential terminal of the first capacitor to the input voltage during the second phase.

31. The power supply of claim 24, wherein the resonant clocking circuit includes:
- a first phase output;
- a second phase output;
- a first inductor coupled between a voltage source and the first phase output;
- a second inductor coupled between the voltage source and the second phase output;
- a first transistor with a source terminal coupled to the base voltage, a drain terminal coupled to the first phase output, and a gate terminal coupled to the second phase output; and
- a second transistor with a source terminal coupled to the base voltage, a drain terminal coupled to the second phase output, and a gate terminal coupled to the first phase output.

32. The power supply of claim 24, wherein the first set of switching devices include power MOSFETs (Metal-Oxide-Semiconductor Field-Effect Transistors).

33. The power supply of claim 24, wherein the first capacitor includes one or more ultra-low-ESR and ultra-low ESL ceramic capacitors.

* * * * *